United States Patent [19]

Honsa et al.

[11] Patent Number: 4,905,772
[45] Date of Patent: Mar. 6, 1990

[54] ROTARY POWER TOOL WITH VIBRATION DAMPING

[76] Inventors: Thomas W. Honsa, 1901 Glenwood Dr., Moline, Ill. 61265; Clifford J. Lafrenz, Rte. 1, Donahue, Iowa 52746; Thomas S. Honsa, 1901 Glenwood Dr., Moline, Ill. 61265; Delbert M. Stutenberg, 807 Wisconsin St., Le Claire, Iowa 52753

[21] Appl. No.: 239,478

[22] Filed: Sep. 1, 1988

[51] Int. Cl.⁴ .............................................. E21B 3/00
[52] U.S. Cl. .................................. 173/162.1; 173/169; 51/170 T
[58] Field of Search .................. 173/162.1, 162.2, 164, 173/170; 51/170 T

[56] References Cited

U.S. PATENT DOCUMENTS 3,934,657  1/1976  Danielson ........................... 173/169
4,635,732  1/1987  Gotsch et al. ..................... 173/162.1

Primary Examiner—Frank T. Yost
Assistant Examiner—Willmon Fridie, Jr.
Attorney, Agent, or Firm—Henderson & Sturm

[57] ABSTRACT

A rotary power tool of the type having a cavity in which is housed a motor containing a rotary shaft is improved by the use of vibration-damping material interposed between the interior of the cavity and the exterior of the motor housing. In one instance of a tool in which the motor is of the air-driven type, the motor housing and casing are ported and the vibration-damping material is configured to enable communication among the ports. In one form of design, the vibration-damping material comprises a sleeve fitting the casing cavity but annularly spacedly surrounding the motor housing but that housing includes axially spaced apart rings of vibration-damping material that tightly encircle the housing and also tightly fit within the sleeve.

11 Claims, 2 Drawing Sheets

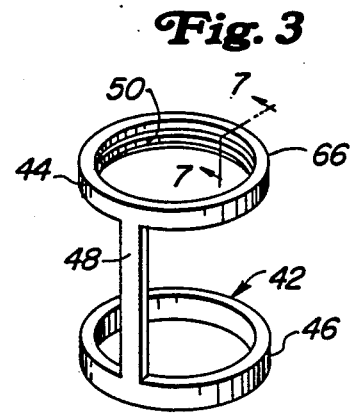
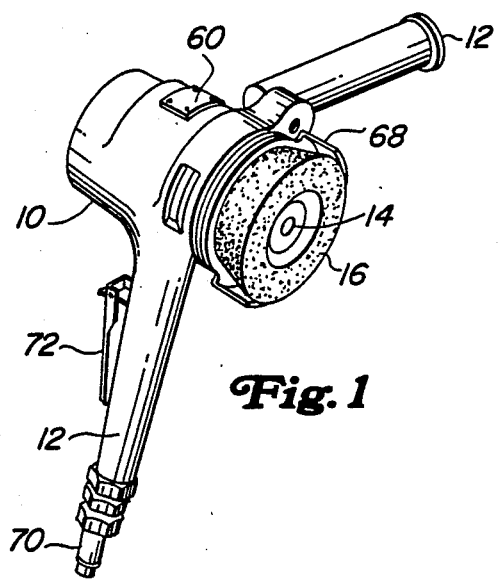
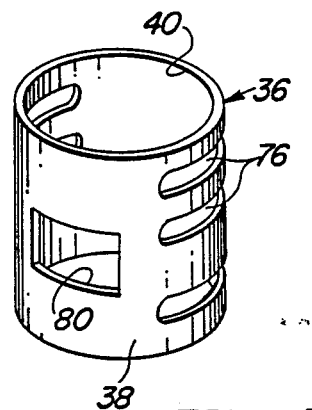
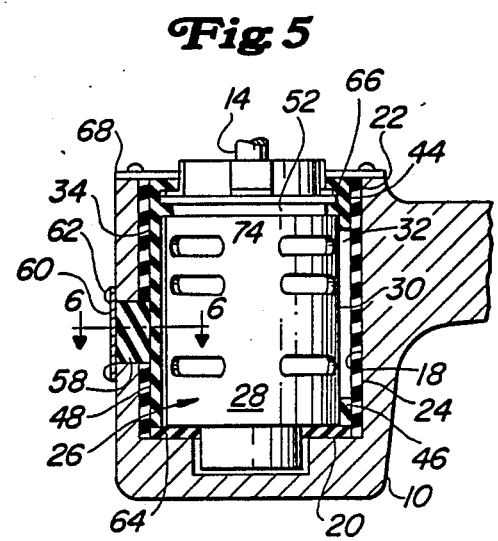
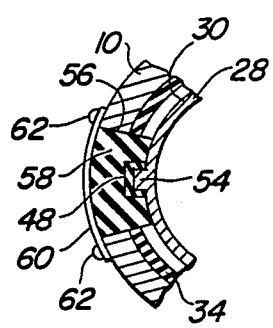
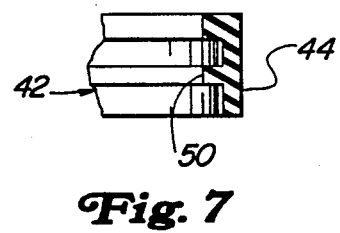

ROTARY POWER TOOL WITH VIBRATION DAMPING

BACKGROUND AND SUMMARY OF THE INVENTION

Although it is broadly known to use various types of vibration-damping material for damping or isolating undesirable forces resulting from the operation of hand-held power tools, there remains considerable room for improvements in design, quality and convenience, especially in the area of adapting existing tools to modern exploitation of damping materials as respects location, quantity and adaptability. One prior example of a significant advance in this art in general forms the basis of the U.S. patent to Honsa, 4,648,468. The present invention is an improvement relating to the solution of problems pointed out in that patent.

In the present instance, the tool selected as the background for the improvement may be a typical hand-held powered rotary tool such as a grinder in which a power means such as a motor is contained within the cylindrical cavity of the grinder or tool body for driving an external grinding wheel. The use of the rotary tools, such as heavy-duty grinders and the like is generally considered to be the most damaging to the operator because of the high levels and frequency of vibrations incident to the use of the tool, in many cases resulting in such trauma as vibration white finger disease and carpal tunnel syndrome, both of which are debilitating hand/arm diseases. The improvements effected by the present invention isolate the vibrations as well as damping sounds emitted by operation of the tool. According to the invention, the dimensional relationship between the outer cylindrical surface of the motor housing and the inner cylindrical wall of the cavity is designed in such manner as to afford an annular space into which suitable vibration-damping material is disposed in tightly fitting relation between the cavity and housing so as to isolate or damp vibrations induced by the motor shaft during grinding operations, for example. Thus the transmission of vibratory forces to the hands of the user is significantly reduced, thereby increasing the user's comfort and consequently his productivity.

It is a further feature of the invention to utilize the improvements in existing tools by simple expedients of modifying existing dimensions, particularly to provide the space required to contain the damping material.

The foregoing features and advantages as well as others will appear as the disclosure progresses herein.

DESCRIPTION OF THE DRAWINGS

FIG. 1 is a small-scale perspective of a typical grinder as representative of a rotary, hand-held powered tool.

FIG. 3 is a perspective of the motor-encircling element of the vibration-damping material.

FIG. 4 is a perspective of the sleeve for the casing cavity.

FIG. 5 is a transverse section showing the assembled relation of the casing, motor and vibration-damping material.

FIG. 6 is a section on the line 6—6 of FIG. 5.

FIG. 7 is a fragmentary section on the line 7—7 of FIG. 3.

DETAILED DESCRIPTION OF A PREFERRED EMBODIMENT OF THE INVENTION

Figure 2:
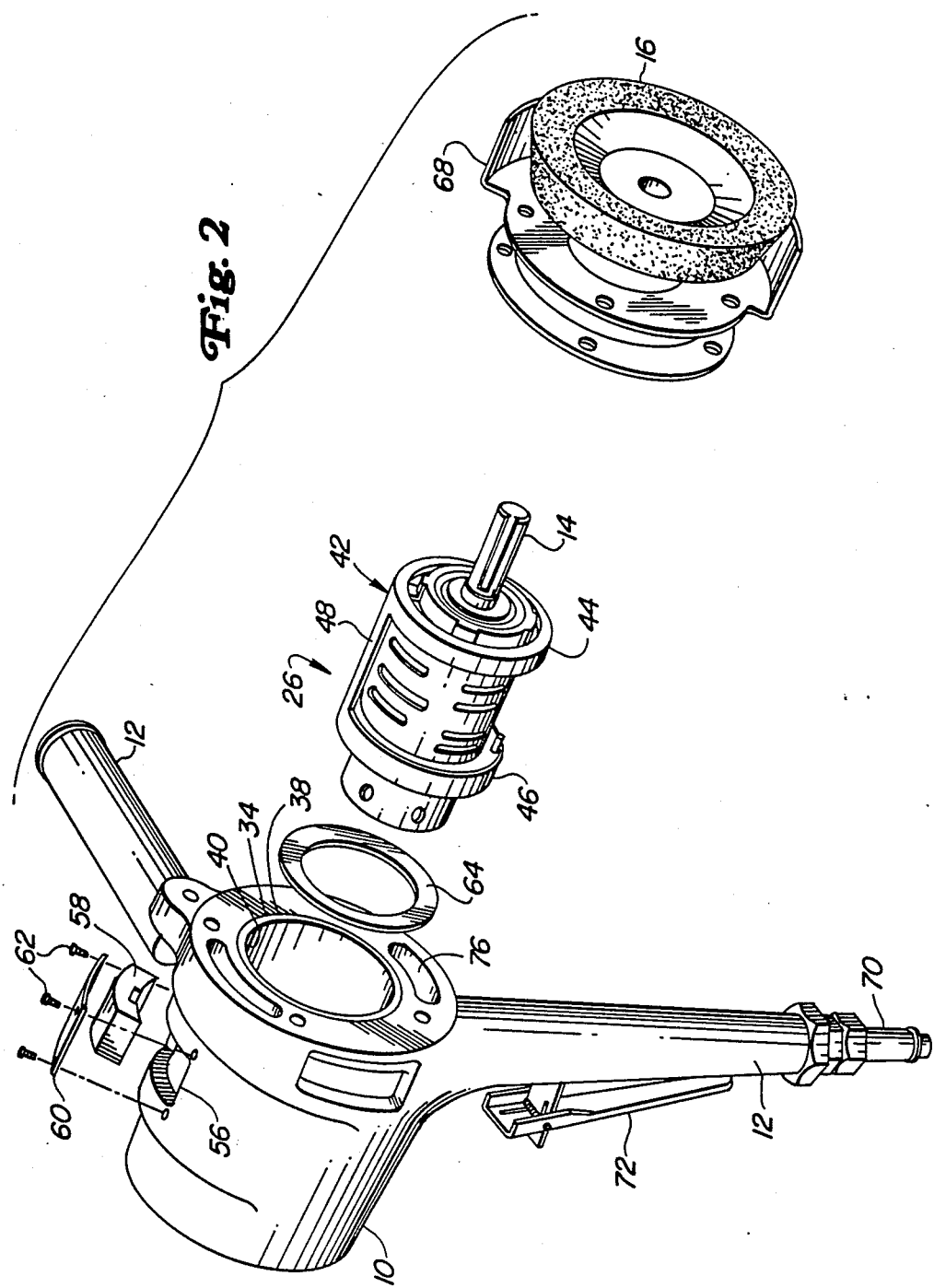
FIG. 2 is an enlarged "exploded" perspective of the tool, showing several of the parts thereof.

The rotary, powered, hand-held tool selected for the purposes of illustration is a typical grinder comprising a casing (10) of rigid construction such as a metal casting of aluminum, for example, having integral divergent handles (12) and journaling a shaft (14) to which is affixed a grinder wheel (16). The manner of the shaft mounting will appear subsequently herein. As best seen in FIGS. 5 and 6, the casing (10) has formed therein a cylindrical cavity (18) having a bottom (20) and a top (22). The bottom is shown as closed in FIG. 6. The top is also closed by means to be later described. The cavity, being cylindrical, has an interior cylindrical surface (24), and within the cavity is a power source, here a motor (26) having a housing (28) which has a cylindrical outer surface (30). The O.D. of the motor housing is smaller than the I.D. of the cavity and thus there exists between the two an annular space (32) occupied in the present case by vibration-damping material (34) of suitable composition, being non-rigid, resilient, long-lived, and capable of eliminating or at least substantially minimizing the transmission of forces from the operation of the grinder to the hands of the user.

It is a feature of the invention that the significant vibration elimination or reduction can be achieved in existing tools as well as those newly manufactured with the vibration-free aspects built in. In an existing tool, the motor is removed from its original rigid mounting in the casting and its O.D. is reduced while the I.D. of the cavity is increased, leading to the establishment of the annular space (32) for the vibration-damping material (34). In a newly manufactured tool, the required dimensional characteristics are designed in for the accommodation of the material (34). The material may be accommodated by the space in such manner as to tightly fit the exterior annular surface of the motor and the inner cylindrical surface of the cavity, plus suitable interlocks.

In one form of the invention, the material (34) may include a sleeve (36) (FIG. 4) of vibration-damping material configured to provide an exterior cylindrical surface (38) of such dimensions as to fit snugly within the cavity of the casing and further having an inner cylindrical surface of a diameter greater than the O.D. of the motor housing (28), resulting in the occurrence of an annular space (unnumbered) between the I.D. of the sleeve and the O.D. of the motor housing. This space will be occupied by a further vibration-damping element (42) (FIG. 3) comprised of upper and lower rings (44 and 46) of elastomer or the like joined by a vertical elastomer rib or bar (48). As best seen in FIGS. 3 and 7, at least the top ring is of T-shaped configuration so as to provide an interior annular rib (50) for interlocking with an annular groove (52) in the motor housing (28). Prior to assembly of the motor housing into the sleeve-lined cavity, the housing is "caged" with the element (42), with the upper and lower rings (44) and (46) snugly encircling the motor housing and the rib or bar, which is of channel section (FIG. 6) tightly fitting a metal rib (54) integral with the motor housing. The interlock of the elastomer rib (48) on the motor housing rib and the interlock of the internal annular rib on the upper ring (44) with the groove (52) in the motor housing, plus the tight fit of the material about the motor housing establish a non-rotatable and non-axially-shiftable relation between the motor housing and element (42). The tight fit of the element (42) within the sleeve or liner establishes a like relationship between the elements (42) and (36) which is further augmented by a mechanical interlock as best seen in FIGS. 2 and 6.

In those figures, it is seen that the casing of the tool has an opening (56) which extends from outside the casing into the casing cavity and is alined with the rib-covered rib on the motor housing (28). A key (58) of vibration-damping material tightly fits the opening (56) and has its inner portion configured as a channel to fit the rib (48) on the element (42), thus locking that element against angular and axial displacement. The legs of the channel also engage the motor housing between the rings (44) and (46) and thus add to the isolation of the motor housing from the casing. The key is retained by a cover plate (60) and a plurality of casing-engaging screws (62).

The vibration-damping material (34), here made up of the sleeve (36) and element (42), as well as other elements to be described at this point, is supplemented at the bottom of the cavity by an elastomer or equivalent washer (64) interposed between the bottom of the cavity and the bottom of the motor housing. Vibration damping is achieved at the upper end of the cavity by axially extending the upper ring (44) sufficiently, as at (66), so that in a pre-final assembly status of the ring, the extension will project somewhat beyond the top of the cavity, being compressible downwardly by affixation of a top cover plate and grinding wheel guard (68) and thus adding compressive forces to the sleeve (36), etc.

In the present case, the motor (26) is of the air-driven type, supplied via an air conduit (70) through one of the casing handles and controlled by a typical external switch (72). As part of the air supply, the motor housing has ports (74), and the casing has ports (76), all as typical of air grinders of this genre. The open nature of the element (42) leaves the motor housing ports uncovered, and the sleeve (36) has openings (76) to enable communication of these ports. The sleeve also has a rectangular opening (80) for accommodating the key (58).

The operation and assembly of the essential parts will have been clear from the foregoing detailed description. Features and advantages other than those pointed out will have become apparent to those versed in the art, as will many modifications of the preferred form of the invention disclosed, all without departure from the spirit and scope of the invention.

I claim:

1. A portable hand-held powered tool comprising a casing of rigid material having a cylindrical cavity and a handle attached to and extending from the casing, a motor having a cylindrical housing disposed coaxially within the cavity and having an outside diameter less than the inside diameter of the cavity so as to provide an annular space between the outer surface of the housing and the interior surface of the cavity, said motor including a coaxial rotary shaft journaled in the housing and projecting axially exteriorly of the casing, vibration-damping material contained within the annular space and relatively tightly fitting between the housing and the cavity so as to minimize the transfer of shaft-induced vibrations from the housing to the casing, said vibration-damping material including a cylindrical sleeve composed of that material and disposed concentrically within the annular space in the cavity and having an outer cylindrical surface fitting the interior of the cavity and an inner cylindrical surface annularly spaced from the outer surface of the motor housing, and a pair of rings composed of vibration-damping material and co-axially spaced apart on and concentrically and tightly surrounding the outer surface of the motor housing and respectively tightly fitting within axially spaced apart portions of the inner surface of the sleeve.

2. A tool according to claim 1, including a rib of vibration-damping material extending lengthwise of and tightly engaging the outer surface of the motor housing and tightly engaging a portion of the inner surface of the sleeve.

3. A tool according to claim 2, in which the rib is integral with the rings.

4. A tool according to claim 2, including mechanical key means locking the rib to the motor housing.

5. A tool according to claim 2, in which the casing has an opening leading into the cavity crosswise of the cavity axis, the sleeve has a registering opening, and key means fits both openings and engages the rib whereby to interconnect the casing, sleeve and rib.

6. A tool according to claim 5, in which the rib is integral with the rings.

7. A portable, hand-held powered tool comprising a casing of rigid material having a cylindrical cavity and a handle attached to and extending from the casing, a motor having a cylindrical housing disposed coaxially within the cavity and having an outside diameter less than the inside diameter of the cavity so as to provide an annular space between the outer surface of the housing and the interior surface of the cavity, said motor including a coaxial rotary shaft journaled in the housing and projecting axially exteriorly of the casing, vibration-damping material contained within the annular space and relatively tightly fitting between the housing and the cavity so as to minimize the transfer of shaft-induced vibrations from the housing to the casing, and interlocking means extending from exteriorly of the casing and into the cavity and engaging the vibration-damping material.

8. A portable, hand-held powered tool comprising a casing of rigid material having a cylindrical cavity and a handle attached to and extending from the casing, a motor having a cylindrical housing disposed coaxially within the cavity and having an outside diameter less than the inside diameter of the cavity so as to provide an annular space between the outer surface of the housing and the interior surface of the cavity, said motor including a coaxial rotary shaft journaled in the housing and projecting axially exteriorly of the casing, vibration-damping material contained within the annular space and relatively tightly fitting between the housing and the cavity so as to minimize the transfer of shaft-induced vibrations from the housing to the casing, said cavity having an open top and a bottom radial to the axis of the cavity and motor housing, vibration-damping material is interposed between the bottoms of the cavity and motor, and means including a vibration-damping element is secured to the casing and closes the top of the cavity and tightly engages the top of the motor housing.

9. A tool according to claim 8, in which the vibration-damping element includes an axial extension of the vibration-damping material beyond the top of the motor housing.

10. A tool according to claim 9, including means secured to the casing at the top of the cavity and operative to compress the axial extension.

11. A portable, hand-held powered tool comprising a casing of rigid material having a cylindrical cavity and a handle attached to and extending from the casing, a motor having a cylindrical housing disposed coaxially within the cavity and having an outside diameter less than the inside diameter of the cavity so as to provide an annular space between the outer surface of the housing and the interior surface of the cavity, said motor including a coaxial rotary shaft journaled in the housing and projecting axially exteriorly of the casing, vibration-damping material contained within the annular space and relatively tightly fitting between the housing and the cavity so as to minimize the transfer of shaft-induced vibrations from the housing to the casing, said motor being of the air-driven type and the motor housing and casing have airports therein, and the vibration-damping material including ports communicating the housing and casing ports.

* * * * *